United States Patent

Pleso

[11] Patent Number: 6,009,480
[45] Date of Patent: Dec. 28, 1999

[54] INTEGRATED DEVICE DRIVER WHEREIN THE PERIPHERAL DOWNLOADS THE DEVICE DRIVER VIA AN I/O DEVICE AFTER IT IS DETERMINED THAT THE I/O DEVICE HAS THE RESOURCES TO SUPPORT THE PERIPHERAL DEVICE

[75] Inventor: Mark F. Pleso, Sharon, Pa.

[73] Assignee: Telxon Corporation, Akron, Ohio

[21] Appl. No.: 08/927,349

[22] Filed: Sep. 12, 1997

[51] Int. Cl.⁶ .................................................. G06F 13/10
[52] U.S. Cl. .................... 710/8; 710/10; 710/38; 710/14; 710/103; 709/300
[58] Field of Search ................... 710/1, 18, 38, 710/9, 103, 8, 10; 709/300; 713/1; 395/112; 296/97

[56] References Cited

U.S. PATENT DOCUMENTS

| | | | |
|---|---|---|---|
| 5,228,118 | 7/1993 | Sasaki | 395/112 |
| 5,339,432 | 8/1994 | Crick | 713/1 |
| 5,386,567 | 1/1995 | Lien et al. | 713/100 |
| 5,390,301 | 2/1995 | Scherf | 709/300 |
| 5,412,798 | 5/1995 | Garney | 713/1 |
| 5,517,646 | 5/1996 | Piccirillo et al. | 713/1 |
| 5,580,177 | 12/1996 | Gase et al. | 400/61 |
| 5,586,268 | 12/1996 | Chen et al. | 710/38 |
| 5,598,563 | 1/1997 | Spies | 713/2 |
| 5,613,123 | 3/1997 | Tsang et al. | 713/1 |
| 5,634,075 | 5/1997 | Smith et al. | 710/9 |
| 5,713,041 | 1/1998 | Chen et al. | 710/1 |
| 5,780,610 | 7/1998 | Collins et al. | 536/24.5 |
| 5,812,796 | 9/1998 | Broedner et al. | 710/103 |
| 5,852,743 | 12/1998 | Yeh | 710/18 |

FOREIGN PATENT DOCUMENTS

| | | |
|---|---|---|
| 407281986 | 10/1995 | Japan . |
| 408101803 | 4/1996 | Japan . |
| 409006702 | 1/1997 | Japan . |

*Primary Examiner*—Thomas C. Lee
*Assistant Examiner*—Tommara Peyton
*Attorney, Agent, or Firm*—Amin, Eschweiler & Turocy, LLP

[57] ABSTRACT

A peripheral device operatively coupleable to a computing system which includes a processor for processing various functions relating to the operation of the peripheral device. The peripheral device also including a memory operatively coupleable to the processor, the memory storing a device driver which the computing system employs to communicate with the peripheral device.

29 Claims, 10 Drawing Sheets

INTEGRATED DEVICE DRIVER WHEREIN THE PERIPHERAL DOWNLOADS THE DEVICE DRIVER VIA AN I/O DEVICE AFTER IT IS DETERMINED THAT THE I/O DEVICE HAS THE RESOURCES TO SUPPORT THE PERIPHERAL DEVICE

FIELD OF THE INVENTION

The present invention relates generally to a method and system for providing and installing a device driver, and more particularly to a method and system for integrating a device driver with the device itself.

BACKGROUND OF THE INVENTION

A computer system typically is connected to various peripheral devices, which include disk drives, tape drives, printers, modems, etc. The computer system has an operating system that provides an interface between an application program and these devices. The operating system receives from the application a request to access one of the devices and translates this request into a request that will be understandable by that device. The operating system sends the translated request to the device and typically informs the application program when the requested access is complete.

In particular, the operating system is responsible for managing the processing and transfer of information between various system resources. One well known technique for managing these resources is the use of device drivers. Device drivers are software modules including processing logic for controlling the low level or device specific components of a particular computer system resource. For example, a device driver may be used for controlling a magnetic disk drive coupled to the computer system. In this example, the device driver would control the various hardware specific registers, latches, signals, or other components of the magnetic disk drive device. Similarly, other computer system resources such as serial or parallel input/output (I/O) ports, modem devices, computer network interface devices, memory expansion boards, etc. are controlled by device drivers. The device drivers are typically loaded into random access memory (RAM) during bootstrap initialization of the computer system.

For instance, an application program may request the operating system to read a file stored on a disk drive. The operating system would invoke a device driver provided for the disk drive and send the device driver this read request. The disk device driver would translate the read request by determining the actual disk location at which the blocks of the file are stored, and would send the read request to the disk drive. The disk drive would then service the read request by reading the disk at the determined actual disk location, and then inform the device driver upon completion. The device driver would then inform the application program that the request has been serviced.

A conventional method used for initially loading device driver software for controlling a peripheral device is to retrieve the driver software from a floppy disk or CD-ROM. Accordingly, peripheral devices are typically shipped from the manufacturer along with a floppy disk or CD-ROM containing the driver software for that device. Alternatively, the appropriate driver software may be provided as a part of the operating system as shown above with respect to the disk drive driver. In this case, the user must properly identify the device added to the computer system in order for the appropriate driver to be loaded.

Corporate computer users often have a plurality of different types of computers, each running a different operating system and using a variety of peripheral devices. As a result, the corporate computer user may need to maintain a library of device driver disks or CD-ROMS associated with a variety of peripheral devices. In the case where the appropriate device driver is selected from the operating system, the user must correctly identify the peripheral device. If the incorrect device driver is selected the peripheral device may malfunction.

Keeping separate floppy diskettes for each type of driver needed on a system oftentimes quickly proves to be an unmanageable task. For instance, in a large company with hundreds of computers, managing all of the different I/O cards for the various computers and the associated drivers which keep changing as devices are relocated from one computer to another became a logistical nightmare.

Microsoft Corporation introduced Windows 95 to remedy the above problem. Windows 95 made available most of the drivers for devices available on the market on a single CD-ROM. However, an arguably unforseen problem with respect to providing the host computer with drivers via Windows 95 is that the device drivers provided with the software package increasingly become outdated as time passes. Thus, as new devices (e.g., 56 K modems) are bought by a user of the system, the driver for which may not be on the Windows 95 CD-ROM which was installed years ago. As a result, the user is back to the same situation when Windows 95 was not available. That is, the user is forced to have to separately obtain the driver for the new device and install it to the host computer typically via downloading the driver from a floppy diskette.

Consequently, there is a strong need for a convenient and reliable method and system for obtaining an appropriate device driver for a peripheral device, which avoids the need for a user to have to manually download the device driver when incorporating the new device to a computing system.

SUMMARY OF THE INVENTION

The present invention relates generally to a method and system for providing and installing a device driver, and more particularly to a system for integrating a device driver with the device itself. The present invention overcomes the problems associated with conventional techniques for installing device drivers by incorporating the device driver within the device being installed. The present invention further provides for a method for retrieving the device driver software from the peripheral device upon powering of the computer system the device has been newly added to. As a result of the driver being located within the device itself, the need to supply a separate disk or CD-ROM with each peripheral device is eliminated. This feature of the present invention removes the need to maintain disks or CD-ROMS containing device driver software.

Additionally, the present invention provides for an integrated device driver system which automatically downloads the device driver to the computer system. This aspect of the invention affords for minimal user intervention to load an appropriate device driver. The integrated device driver system of the present invention may also includes a device driver that may be operating system and/or processor independent. This feature of the present invention allows the device being installed to the computer system to be platform independent, which affords for the device to be connectable and communicable with a variety of different computing systems.

In accordance with one particular aspect of the present invention, a peripheral device operatively coupleable to a computing system is provided, including: a processor for processing various functions relating to the operation of the peripheral device; and a memory operatively coupleable to the processor, the memory storing a device driver for the peripheral device.

According to another aspect of the present invention, a system for installing a peripheral device to a computer system is provided, including: a peripheral device operatively coupleable to the computer system, the peripheral device including a first processor and a first memory, the first memory storing a device driver for the peripheral device; a second processor for processing functions relating to the computer system, the second processor being operatively coupleable to the peripheral device; and a second memory operatively coupleable to the second processor; wherein the peripheral device downloads the device driver to the second memory after being operatively coupled to the computing system.

Another aspect of the present invention provides for a method for installing a peripheral device driver to a computer system, including the steps of: connecting a peripheral device to the computer system, the peripheral device including: a first processor for processing various functions relating to the operation of the peripheral device; and a first memory operatively coupleable to the processor, the first memory storing the peripheral device driver for the peripheral device; transferring the peripheral device driver from the first memory to the computer system, the computer system including: a second processor for processing functions relating to the computer system, the second processor being operatively coupleable to the peripheral device; and a second memory operatively coupleable to the second processor.

In accordance with still another aspect of the present invention, a method for installing a peripheral device driver to a computer system is provided, including the steps of: connecting a peripheral device to the computer system; and using the peripheral device to identify to the computer system a web site on an Internet having a peripheral device driver for the peripheral device.

To the accomplishment of the foregoing and related ends, the invention, then, comprises the features hereinafter fully described and particularly pointed out in the claims. The following description and annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

The drawings are now referred to which are for purposes of illustrating the preferred embodiment of the invention only and not for purposes of limiting the same. In the drawings, like reference numerals are used to refer to like elements throughout.

Figure 1:
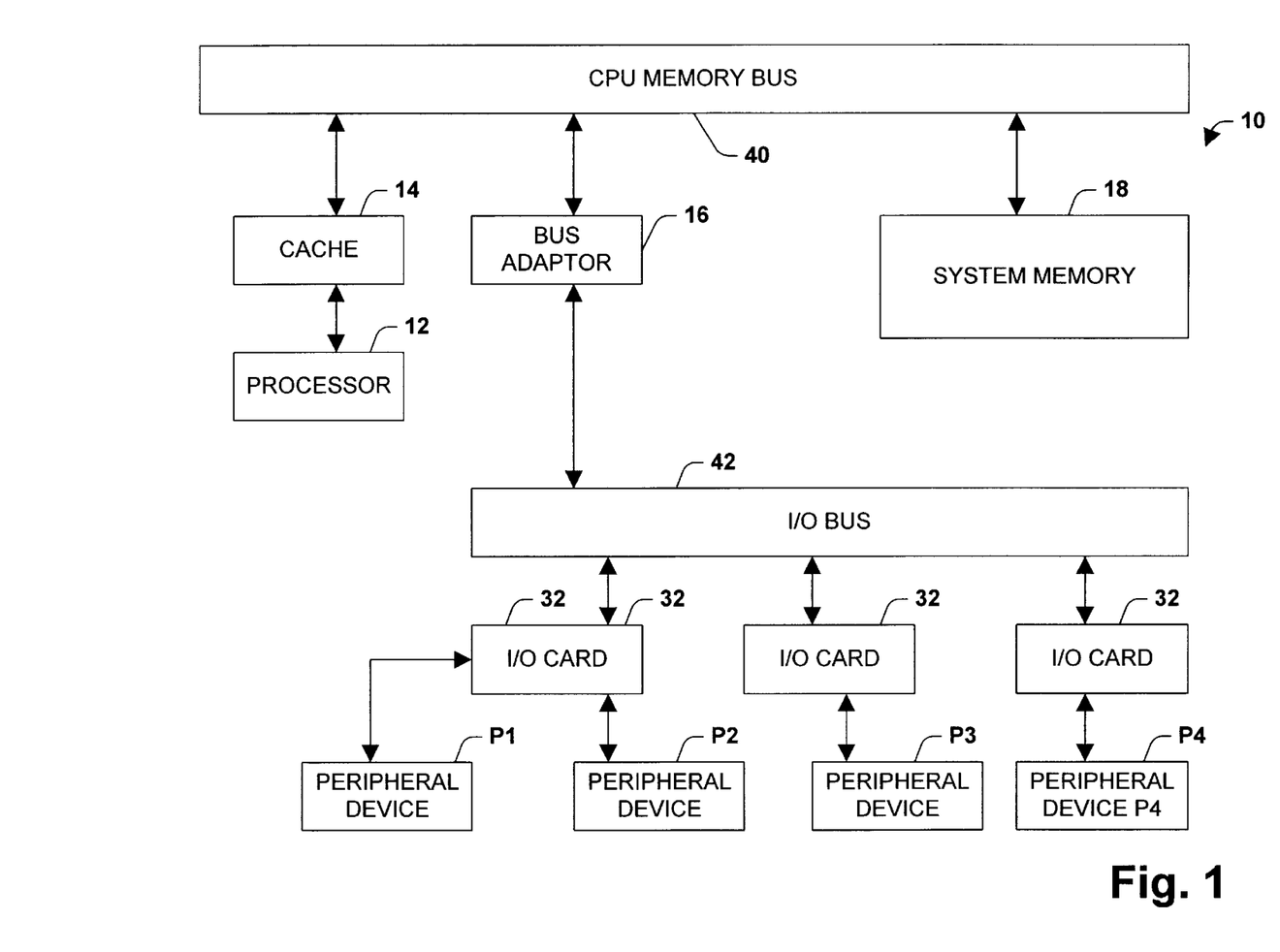
FIG. 1 is a block diagram of an exemplary computer system in accordance with the present invention.

FIG. 1 shows a simplified block diagram of an exemplary computer system 10. Computer system 10 is generally comprised of a processor 12, a cache 14, a bus adapter 16, a system memory 18, adapters or I/O cards 32 and peripheral devices P1–P4.

The processor 12 is responsible for controlling the general operation of the computer system 10. The processor 12 is programmed to control and operate the various components within the computer system 10 in order to carry out the various functions described herein. The processor or CPU 12 can be any of a plurality of processors, such as the p24T, Pentium 50/75, Pentium 60/90, and Pentium 66/100, Pentium PRO and Pentium 2, and other similar and compatible processors. The manner in which the processor 12 can be programmed to carry out the functions relating to the present invention will be readily apparent to those having ordinary skill in the art based on the description provided herein.

The system memory 18 tied to the processor 12 via a cpu memory bus 40 is also included in the computer system 10 and serves to store program code executed by the processor 12 for carrying out operating functions of the computer system 10 as described herein. The system memory 18 also serves as a storage medium for temporarily storing information such tables, and the like.

The system memory 18 includes read only memory (ROM) and random access memory (RAM). The ROM contains software instructions known as the Basic Input/Output System (BIOS) for performing interface operations with the I/O devices. Also stored in the ROM is a software routine which operates to load a boot program from the booting device. The boot program will typically be executed when the computer system 10 is powered on or when initialization of the system 10 is needed. The RAM is the main memory into which the operating system and application programs are loaded. The RAM provides program instruction storage and working memory for the processor 12.

Processor 12, cache 14, bus adapter 16 and system memory 18 communicate via the processor-memory bus 20.

An I/O bus 42 links bus adapter 16 to I/O cards 32, which interface with peripheral devices P1–P4. Peripheral devices P1–P4 may take many forms including, but not limited to, a hard disk drive, a floppy disk drive, a printer, an optical storage device, a keyboard, a mouse, a display unit (e.g. an LCD display or CRT monitor), a modem, a bar code reader, a scanner, and a network. I/O cards 32 are controller cards which enable processor 12 to communicate with and control the peripheral devices (P1–P4). In this regard, I/O cards 32 provide an interface port supporting the attachment of specific peripheral devices. For instance, I/O card 32 may be a PC serial port adapter which creates a communications port where a modem can be attached. It should be appreciated that I/O cards 32 may be integrated on a PC's motherboard or on adapter boards that plug into expansion slots.

Typically, the I/O cards 32 communicate with the processor 12 by generating interrupts. The processor 12 distinguishes interrupts from among the I/O cards 32 through individual interrupt codes assigned thereto. Responses of the processor 12 to the I/O card interrupts differ, depending, among other things, on the devices generating the interrupts. Interrupt vectors are provided to direct the processor 12 to different interrupt handling routines.

The interrupt vectors are generated during initialization (i.e., boot up) of the computer system 10 by execution of the BIOS. Because responses of the processor 12 to device interrupts may need to be changed from time to time, the interrupt vectors may need to be modified from time to time in order to direct the processor 12 to different interrupt handling routines. To allow for modification of the interrupt vectors, they are stored in the RAM during operation of the computer system 10.

I/O bus 42 may take many forms including, but not limited to, Integrated Standard Architecture (ISA), Extended Industry Standard Architecture (EISA), Peripheral Component Interconnect (PCI), Personal Computer Memory Card Industry Association (PCMCIA), Universal Serial Bus (USB), Small Computer System Interface (SCSI), Video Electronics Standards Association (VESA), Micro Channel Architecture (MCA), IEEE-1394 ("FireWire"), CardBus and proprietary.

The components illustrated in FIG. 1 may be embodied in a personal computer, a portable computer, a workstation, a minicomputer, a main frame computer, a super computer, a network of computers, etc. As such, the details of the physical aspect of the computer system 10 such as structure of the I/O bus 42 or the number of processors 12 that are coupled to the bus 42, is not crucial to the operation of the invention and thus is not described in significant detail below.

The present invention will now be described with reference to computer system 10 as configured to include an ISA I/O bus, Plug and Play (PNP) ISA I/O controller cards (having a memory and a control unit), and a PNP BIOS. However, it should be appreciated that this computer system 10 is described solely for the purpose of illustrating a preferred embodiment of the present invention, and not for limiting same. In this respect, the present invention is suitable for use with other computer system standards not specifically described herein.

The Plug and Play specification allows for the automatic configuration of Plug and Play expansion cards. Any conflict that may exist between different PNP cards is automatically resolved by the system. The two key functions performed by the PNP system BIOS are resource management and runtime configuration. The basic system resources which include the direct memory access (DMA) channels, interrupt request lines, and the I/O and memory addresses, are allocated by the PNP system BIOS in its resource management mode. Because there are thousands of expansion cards available, these system resources are commonly allocated in a conflicting manner in ISA systems, which can lead to bootstrap and system configuration failures. In its role as resource manager, the PNP system BIOS configures the PNP expansion cads before or during the Power On Self Test (POST) procedure. The PNP system BIOS performs the same POST requirements of existing ISA computer systems. During the PNP configuration phase, the PNP expansion cards provide their resource requirements to allow the system BIOS to perform resource allocation and conflict resolution. After the configuration procedure is complete, POST is executed.

After the POST procedure is completed, control is transferred from the system BIOS to the operating system software. However, in runtime configuration mode, the system BIOS does not provide configuration services for system board devices after the POST procedure has finished. This feature allows the system BIOS to dynamically change the resources allocated to system board devices after the operating system has been loaded thereby allowing the operating system software to manipulate the configuration of the system board devices. The Plug and Play ISA specification by Microsoft Corp. is hereby incorporated herein by reference in its entirety.

Figure 2:
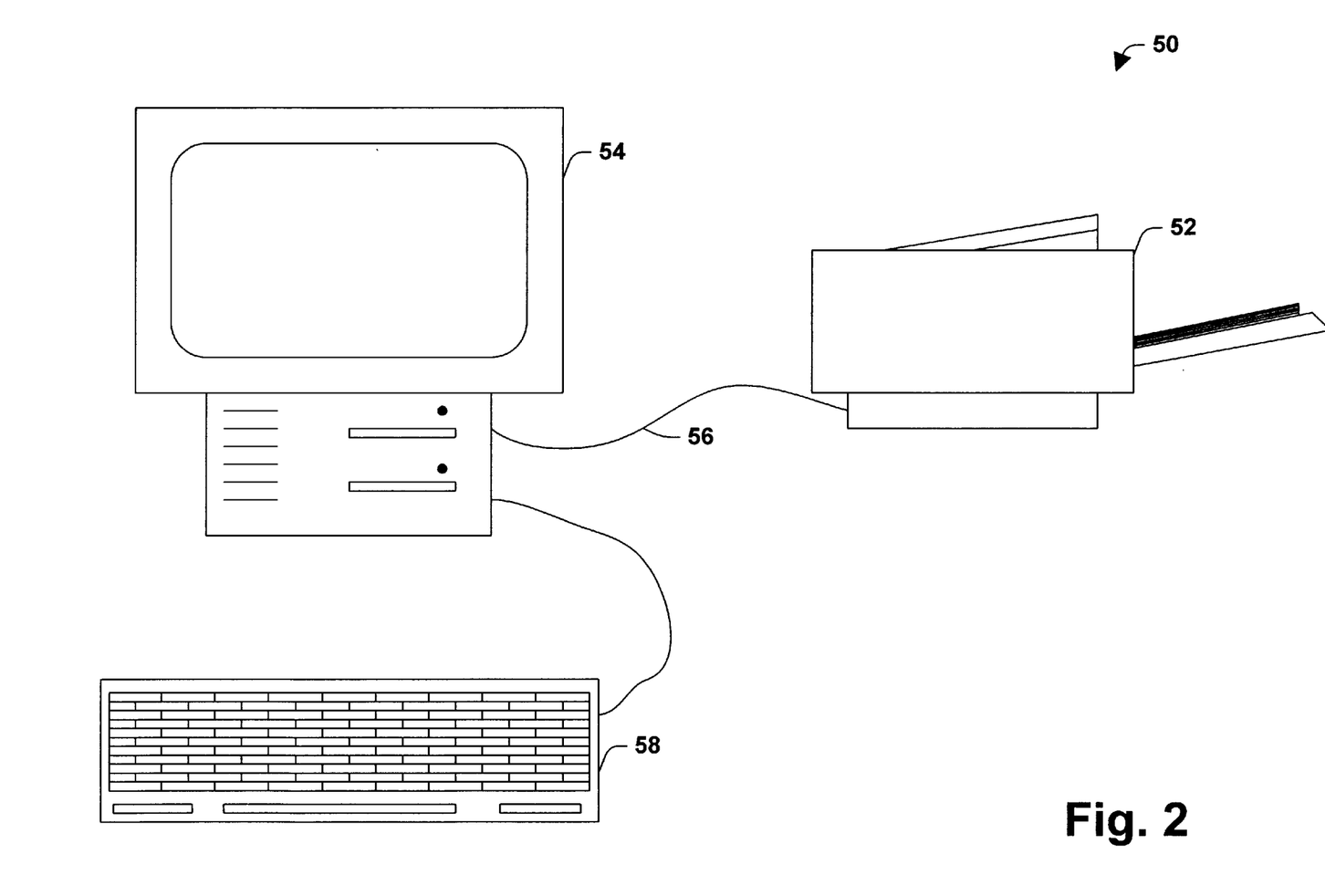
FIG. 2 is an illustration of a computing system coupled to a peripheral printing device in accordance with one particular aspect of the present invention.

Referring now to FIG. 2, there is shown a printing system 50 in accordance with one specific aspect of the present invention. However, it should be appreciated that the present invention can be applied to any computer system including a peripheral device suitable for carrying out the present invention. The printing system 50 consists of a printing device in the form of a laser printer 52 capable of performing print jobs according to print data, a data processing device in the form of a host computer 54 which provides the laser printer 52 with the print data, and a communication cable 56 connecting the laser printer 52 to the host computer 54. A keyboard 58 is coupled to the host computer 54 to afford a user to manually enter data and instructions.

Figure 3:
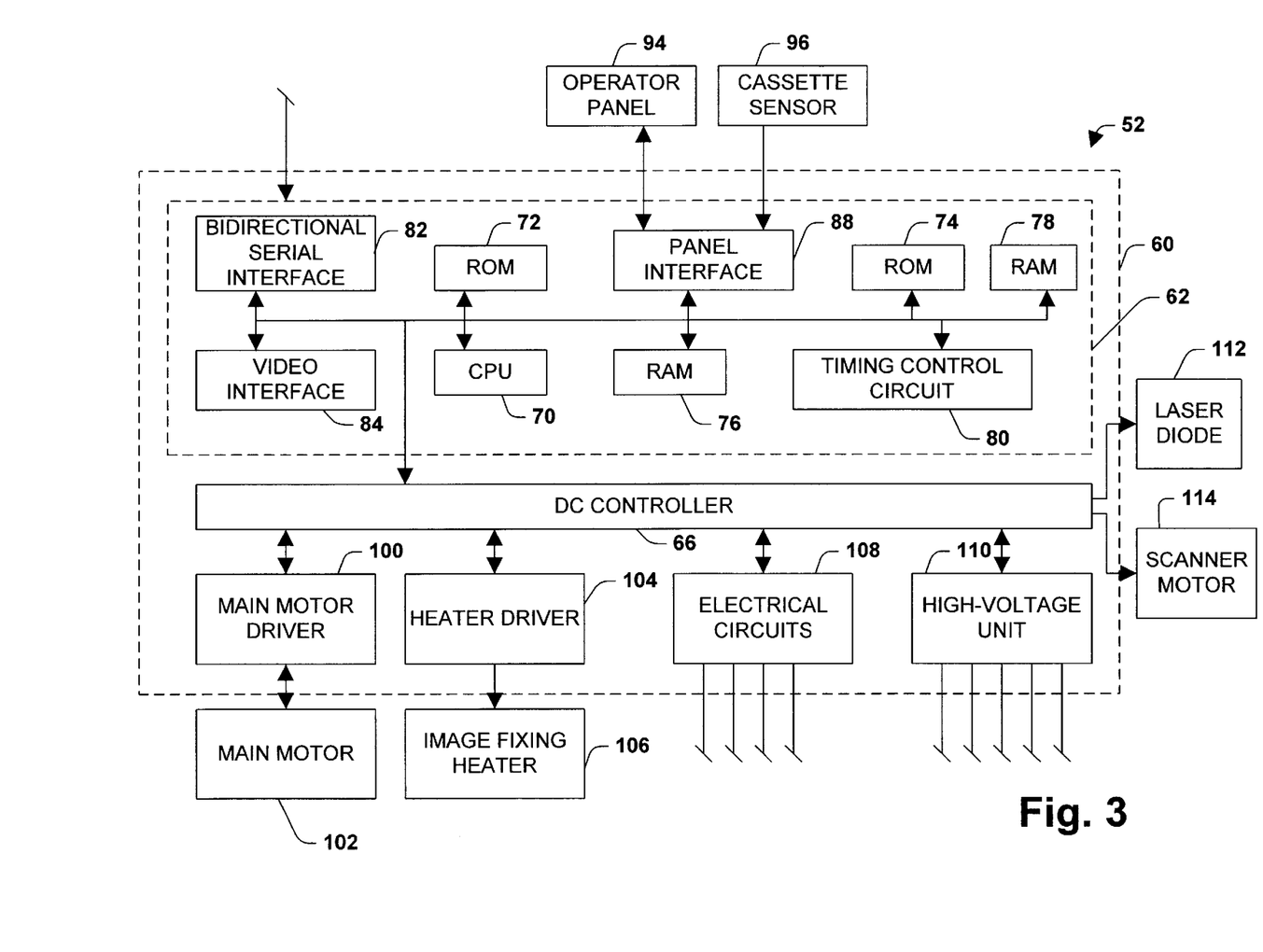
FIG. 3 is a schematic block diagram showing a general laser printer in accordance with the present invention.

The laser printer 52 has a control unit generally indicated at 60 in FIG. 3. The control unit 60 includes a video controller 62 and a DC controller 66. The video controller 62 incorporates: a CPU (central processing unit) 70; a first ROM (read-only memory) 72; a second ROM (read-only memory) 74; a first RAM (random-access memory) 76; a second RAM 78; a timing control circuit 80; a bidirectional serial interface (I/F) 82; a video interface 84; a panel interface 88; and a data bus 96 which interconnects the elements of the video controller 62 described above.

The first ROM 72 stores: various control programs associated with printing operations of the printer 52; LANGUAGE INTERPRETER A and LANGUAGE INTERPRETER B for processing or interpreting printing control languages in which print data received from the host computer 54 are described or expressed; interpreter-identification data representative of the INTERPRETER A and INTERPRETER B; and an ID DATA OUTPUT control program for sending the interpreter-identification data to the personal computer PC in response to an inquiry signal from the personal computer PC, as described below.

The second ROM 74 stores outline data representative of the outlines of a multiplicity of characters such as letters and symbols to be printed according to the print data received from the personal computer PC. The first RAM 76 has a suitable storage capacity for storing the print data and other data received from the personal computer PC, and the second RAM 78 is a working memory which includes a storage area for storing a batch of dot data prepared by conversion from the print data stored in the first RAM 76. The timing control circuit 80 generates timing signals for storing data into the first RAM 76 and reading out the data from the first RAM 76. The serial interface (I/F) 82 functions to receive data from the host computer 54 and transmitting various sorts of data and signals to the host computer 54. The video interface 84 consists of two scan buffers each of which is a dual-port RAM (FIFO memory) having a 4 K-byte capacity.

The video interface 84 functions to apply the dot data one set after another from the second RAM 78 to the DC controller 66. The panel interface 88 is connected to an operator's panel 94 and a cassette sensor 96 of the laser printer 52. The LANGUAGE INTERPRETER A is suitable for interpreting a printing control language (print data language) for a personal or office printer for ordinary text-oriented documentation, while the LANGUAGE INTERPRETER B is suitable for interpreting a printing control language (print data language) for a plotter generally used in the field of computer-aided design (CAD).

As described above, the interpreter-identification data which represent these INTERPRETERS A, B are stored in the first ROM 72, and are transmitted to the host computer 54 according to an ID DATA OUTPUT control program, in response to an inquiry signal from an host computer 54. The cassette sensor 96 acts on a detecting piece provided at a suitable portion of a paper storage cassette mounted in the laser printer 52, so that the sensor 96 generates a paper size signal indicative of the size of paper sheets accommodated in the cassette. The paper size signal is fed to the panel interface 88.

To the DC controller 66 of the control unit 60, there are connected a main motor driver 100 for a main motor 102, a heater driver 104 for an image fixing heater 106, an electrical circuit 108, and a high-voltage unit 110. To the DC controller 66, there are also connected a semiconductor lasing element in the form of a laser diode 112, and a scanner motor 114 for rotating a polygon mirror which has six light reflecting faces for scanning a photoconductive drum with the laser beam which is generated by the laser diode 112 and deflected by the polygon mirror, as well known in the art. FIG. 3 is indicative of the hardware associated with a conventional laser printer, and thus further discussion with respect thereto is omitted for sake of brevity.

It will be appreciated that the present invention relates to the device driver for the printer 52 being located within the memory (e.g., ROM 72) of the printer 52. Thus, the particular hardware associated with the peripheral device being employed is not critical to the present invention. Rather, it is to be appreciated that the present invention provides for a peripheral device which includes within its memory a device driver which is downloadable to a computing system so that the computing system can communicate with the peripheral device.

Figure 4:
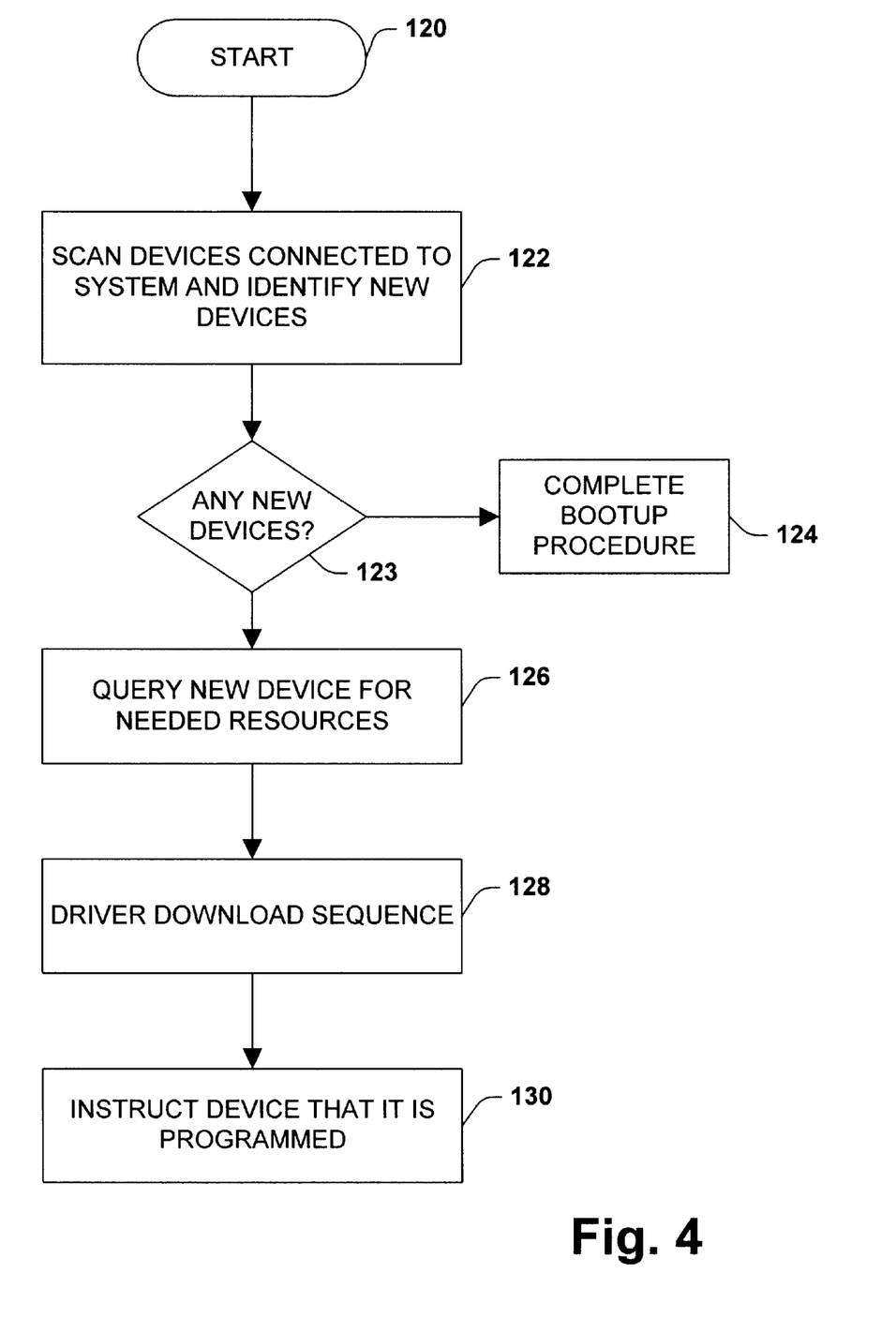
FIG. 4 is a flow diagram showing an overview of a peripheral device downloading a device driver to a computer system in accordance with the present invention.

Referring now to FIG. 4, a flow diagram showing an exemplary high-level implementation of one specific aspect of the present invention is shown. This example, relates to the printer 52 being newly added to the computer system 10. However, it will be appreciated that this implementation may be applied to any number and variety of peripheral devices suitable for carrying out the present invention.

In step 120, the host computer 54 is booted up and general initializations are performed. During this bootup procedure the processor 12 determines if there are any I/O cards 32 that have not been identified yet. The I/O cards 32 can be located either within the host computer 54 or at the peripheral device (e.g., printer 52).

For example, if the peripheral devices are Universal Serial Bus (USB) devices, there will be a USB connector on the computer 54, which has a multidrop connector for incorporating the plurality of peripheral devices (e.g., P1–P4) to the host computer 54. The USB provides for not having to attach independently all of the peripheral devices directly to the host computer 54 itself.

In step 122, the processor 12 scans all devices connected to the system 10 and identifies in step 123 any new devices that have not been configured yet. This is accomplished by a sequence of events. As mentioned above, in step 120, the processor 12 determines if there are any new devices connected to the system. If no new devices are found in step 120, the processor 12 proceeds to step 124 where it completes its bootup procedure. If a new device (e.g. printer 52) is found, the processor 12 in step 126 queries the printer 52 for what resources the printer 52 needs (e.g., how many interrupts does the printer 52 need, does the printer 52 need any DMA channels, how much address space does the printer 52 need, etc.). In step 126, the printer 52 replies with what its needs are. The processor 12 looks at a table of resources stored within the system memory 18 for the requested resources. The processor 12 assigns the resources and tells the printer 42 what resources it has.

After, the assignment, the processor 12 initiates a driver download sequence in step 128. The driver download sequence can be implemented just before Windows 95 is complete. Thus, when a device (e.g., I/O card 32 and/or peripheral device P1–P4) is found that requires a driver, the driver sequence can be implemented during the PNP sequence. This step involves downloading the peripheral device driver from the peripheral device to the host computer 54. The driver can be stored in flash memory of the I/O card 32 if desired. The peripheral device stores its driver within its own memory and during the PNP sequence it downloads the driver to the memory (e.g., hard disk) of the host computer 54.

The host computer 54 via the I/O card 32 prompts the peripheral device 52 to download the driver. Since the I/O address has already been assigned to the device 52, and the host computer 54 can talk to the device 52, it will send a unique command to the device 52 via a base address. This unique command will prompt the device 52 to download the driver code to the host computer. In the preferred embodiment, the driver is written in a processor independent language such as "C", JAVA, etc. If JAVA is employed the driver becomes platform independent and thus the device can be hooked up to any type of computer due to being platform independent. The peripheral device will go into driver download mode.

Figure 5A:
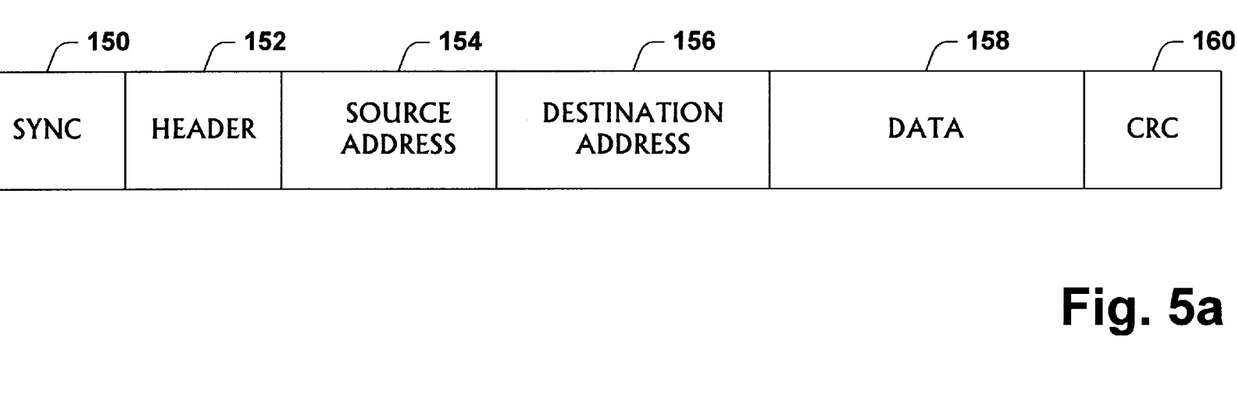
FIGS. 5a and 5b are illustrations of data packet formats in accordance with the present invention.
Figure 5B:
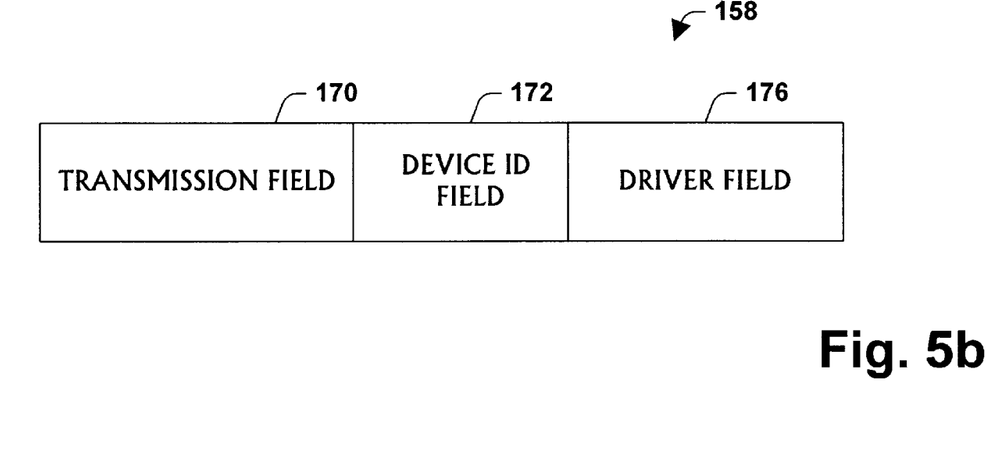

The manner for downloading will vary based on the type of interface between the host computer and the device. For example, if an ISA interface is being employed the device 52 will use an ISA data bus and download 8 to 16 bits per time of the JAVA or C driver code. Thus, the driver will be installed from the device to the host computer byte by byte over the ISA bus. If the interface is a USB, the code will be downloaded via a serial packet. A typical packet format would be used with a header, etc. The packet will go back via the bus to the host computer 54. The host computer 54 would reconstrust the packet back into the original driver code, and send a command back to the peripheral device 52 to end the downloading of the device driver. The USB interface chip plus host software would handle the receiving of the packet. FIGS. 5a and 5b illustrate exemplary packet formats for carrying out the present invention.

In step 130 instructs the printer 52 that it is programmed and that it should no longer respond as unprogrammed. Thus, the next time the host computer 542 is booted and undergoes the PNP sequence, the printer 52 will respond as configured.

Referring briefly to FIGS. 5a and 5b, an exemplary format for packets sent between devices in the system 10 is shown. Each packet includes a number of fields such as a synchronization field 150, a header field 152, a source address field 154, a destination address field 156, a data field 158, and an error correcting field (CRC) 160, for example. The synchronization field 150 includes synchronizing bits which allow a device (e.g., host computer 54) receiving the packet an opportunity to "sync" to the packet as is conventional. The header field 152 follows the synchronization field 150 and includes information such as the length and type of the packet. For example, the header field 152 may indicate whether the packet is a type which requires a response from the receiving device (e.g., host computer 54). The source address field 154 follows the header field 152 and includes an address of the device (e.g., printer 52) from which the packet originated. Following the source address field 154, the packet includes a destination address field 156 which holds the address of the device (host computer 54) to which the packet is ultimately destined. The data field 158 in the packet includes various information (see FIG. 4B) intended to be communicated to the receiving device. The packet ends with a cyclical redundancy code (CRC) field 160 which serves as an error correcting field according to the conventional techniques such that a receiving device can determine if it has properly received the packet.

FIG. 5B illustrates in greater detail the information contained in the data field 158 of packets transmitted from peripheral devices P1–P4 to the host computer 54. The data field 158, includes a transmission type field 170 which identifies the type of transmission being made by the peripheral device P1–P4 to the destination device. For example, the transmission type field 170 may indicate that the transmission being made is that of a device driver being downloaded. The data field 158 also includes a device ID field 172 which contains an identification code for the particular peripheral device P1. The identification code identifies and distinguishes the peripheral device P1 to the system 10 with respect to other peripheral devices within the computer system 10. The data field 208 further includes a driver field 176 which contains a compressed version of the device driver which is later expanded to the processor 12 upon stripping the packet for the device driver.

Figure 6:
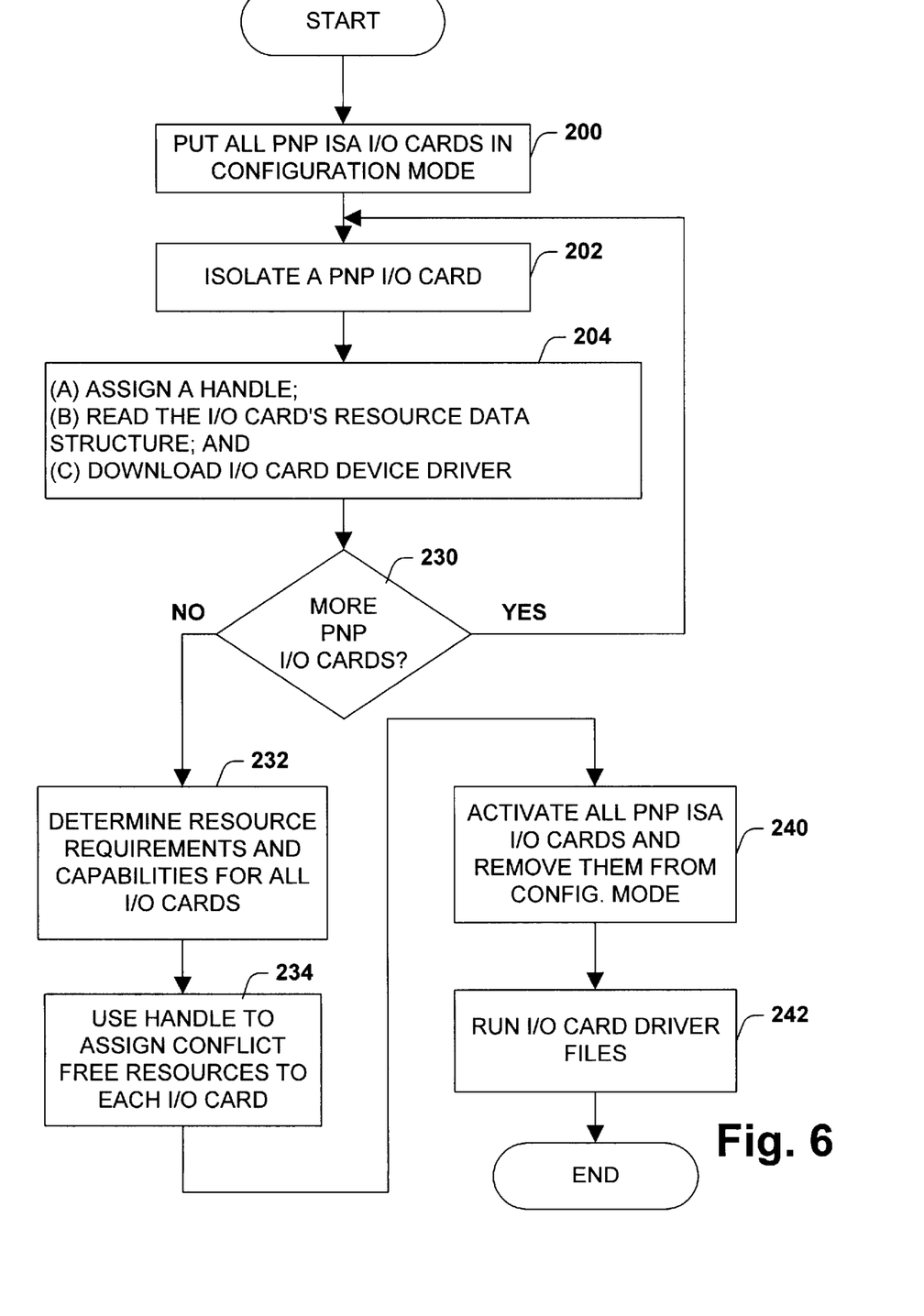
FIG. 6 is a flow diagram showing an overview of the procedure for configuring a computer system using Plug and Play (PNP) Industry Standard Architecture (ISA), according to one particular aspect of the present invention.

Referring now to FIG. 6, there is shown an overview of an ISA configuration flow for a computer system having a PNP BIOS. It should be appreciated that the ISA configuration flow disclosed herein is slightly modified for use with a non-PNP BIOS. After the computer system 10 (e.g., a PC running Microsoft WINDOWS 95 operating system) is powered on, all PNP I/O cards are initially set in an inactive mode and do not respond to any ISA bus commands. At step 200 all PNP I/O 32 cards are put in configuration mode by the computer system's software issuing an initiation key sequence. The initiation key sequence includes a series of I/O port writes to auto configuration I/O port registers on each PNP I/O card 32. All of the PNP I/O cards 32 simultaneously check the initiation key sequence. If the initiation key sequence is properly received, the PNP I/O card 32 will set itself to configuration mode in step 202.

Next, each PNP I/O card is isolated one at a time. In this regard, each PNP I/O 32 card is isolated using feedback data on the I/O bus 42, which uniquely isolates each PNP I/O card 32 by a 72-bit serial identification code. Each PNP I/O card is assigned a serial identification code that is stored in memory on the PNP I/O card 32.

At step 204, (A) a handle (i.e., Card Select Number) is assigned to the isolated PNP I/O card by the processor 12, (B) the PNP I/O card's resource data structure is read by the processor 12 and (C) the I/O card driver is downloaded to the processor 12 from the isolated PNP I/O card 32. The handle provides means for selecting a unique PNP I/O card 32 without the need to use the more elaborate and time consuming isolation protocols.

The resource data structure is read by the processor 12 by writing the address of a desired PNP register to an ADDRESS port, followed by a read of data from the READ_DATA port. The READ_DATA port is used to read information from the PNP registers. Each time the processor reads from the READ_DATA port, a bus width of data (i.e. data the size of the width of I/O bus 42) is provided. Accordingly, data is read from the READ_DATA port a plurality of times to obtain the complete resource data structure. The resource data structure describes the resources supported and those requested by the functions on the isolated PNP I/O card. When all resource capabilities and demands are known, a process of resource arbitration is invoked to determine resource allocation to each PNP I/O card 32.

Figure 7:
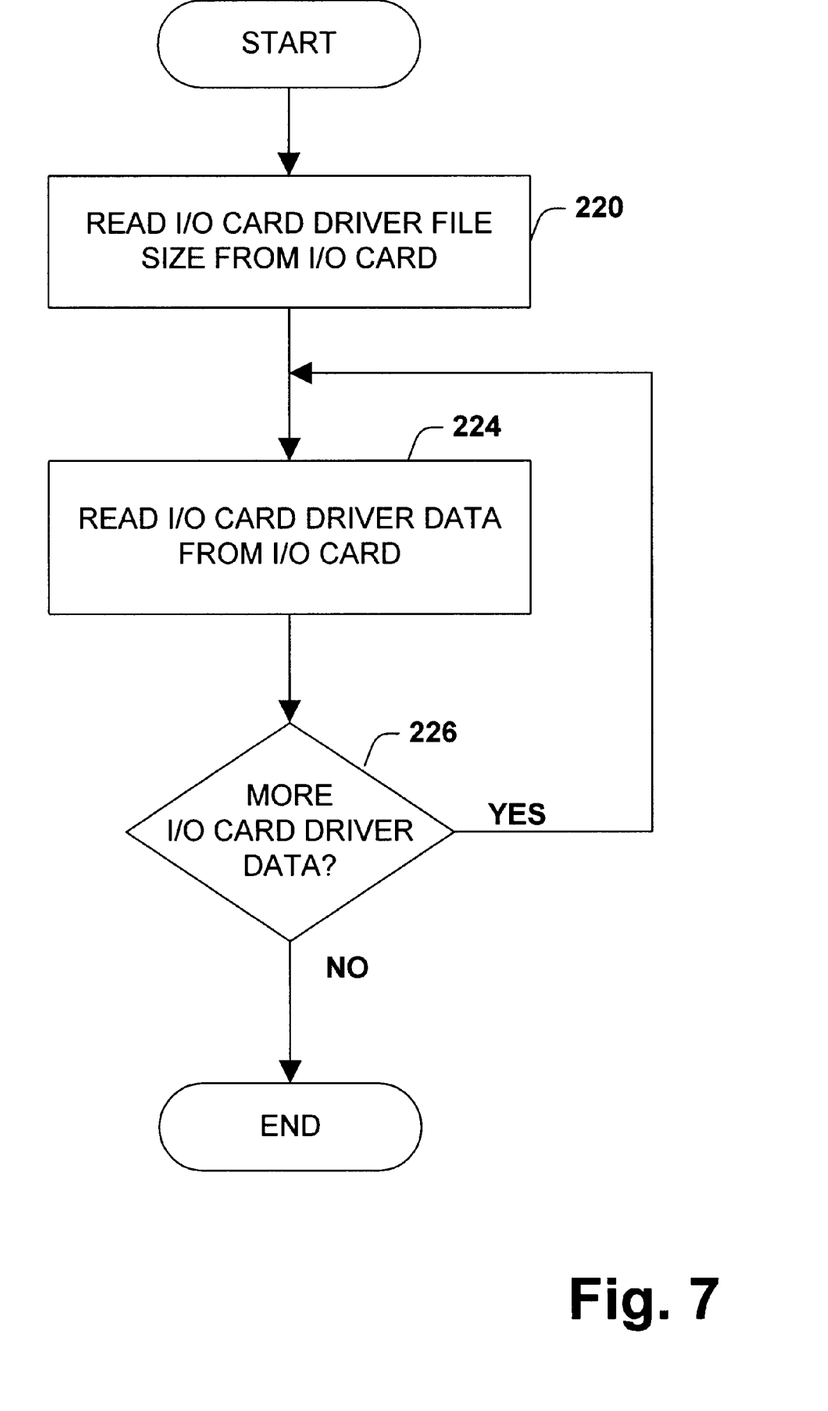
FIG. 7 is a flow diagram of the procedure for downloading an I/O card driver according to one particular aspect of the present invention.

Referring briefly to FIG. 7, the procedure for downloading the I/O card driver will be described in detail with reference to a flow diagram. At step 220, the file size of the I/O card driver is read from the PNP I/O card 32 by the processor 12. As in the case discussed above, the processor 12 writes the address of a desired register to the ADDRESS port, followed by a read of data from the READ_DATA port. Next in step 222, the processor 12 writes the address of a desired register to the ADDRESS port, followed by a read of data from the READ_DATA port, in order to obtain I/O card driver data. As discussed above, each time the processor 12 reads from the READ_DATA port, a bus width of data (i.e. data the size of the width of I/O bus 30) is provided. Accordingly, the processor in step 226 will read I/O card driver data from the READ_DATA port a plurality of times to obtain all of the I/O card driver data. Once all of the I/O driver data has been obtained, the process is ended. The number of read requests is based upon the I/O card driver file size. The complete I/O card driver data forms an I/O card driver file, which is stored in the system memory 18.

Returning back to FIG. 6, the configuration sequence next continues to step 230 where it is determined if another PNP I/O card needs to be isolated for configuration. If no further PNP I/O cards 32 need to be isolated, then the processor 12 in step 232 determines that the resource requirements and capabilities for all I/O cards have been determined. If in step 230 it is determined that more PNP I/O cards need to be configured, the processor 12 returns to step 202. In step 234, the handles are then used to assign conflict free resources to each PNP I/O card 32. Thereafter, in step 240, all of the PNP I/O cards 32 are activated to respectively remove them from configuration mode.

Figure 8:
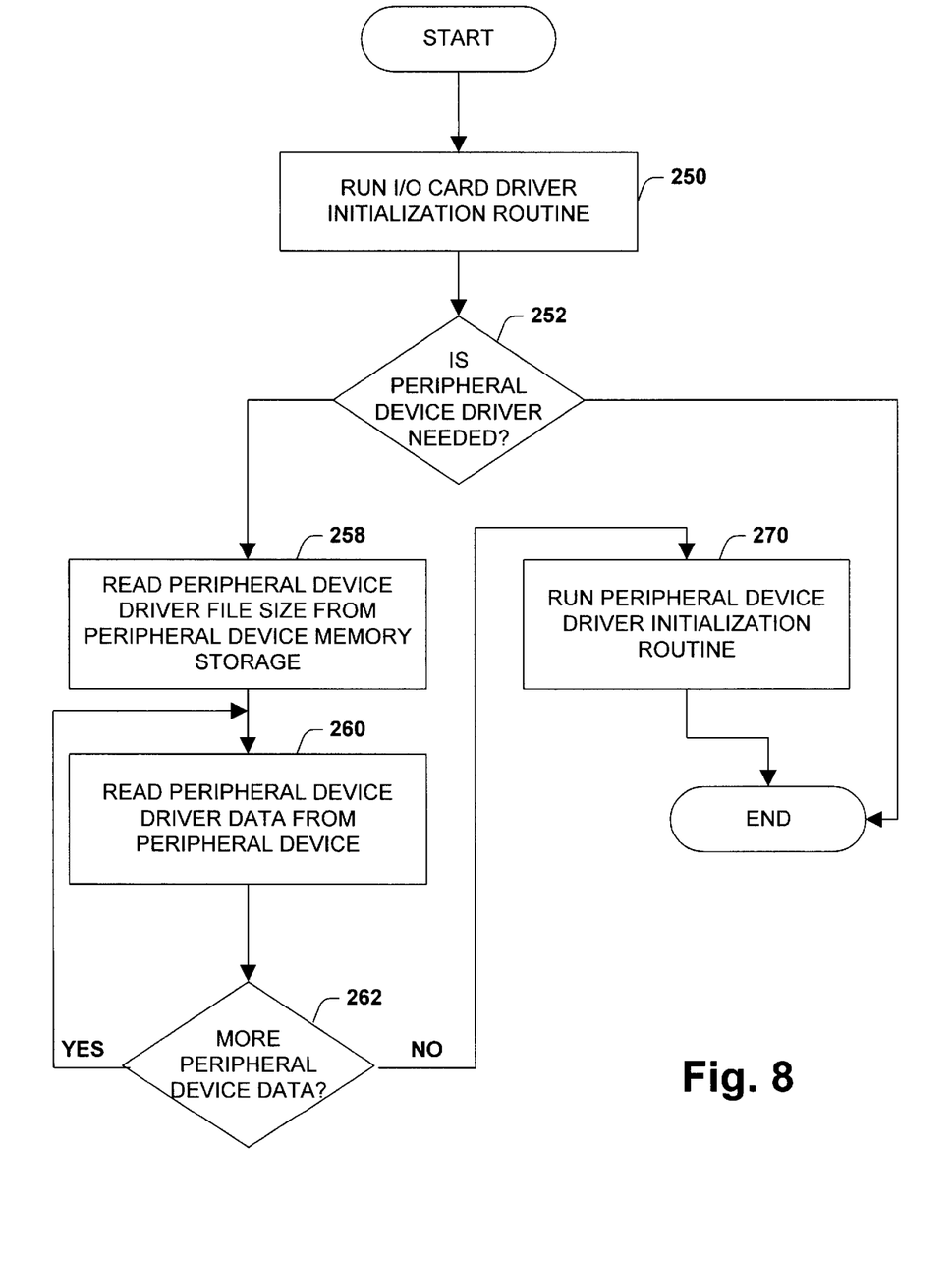
FIG. 8 is a flow diagram of the procedure for running an I/O card driver for downloading a peripheral device driver according to one particular aspect of the present invention.

Next in step 242, the I/O card driver files stored in the system memory 18 are run. A detailed description of step 242 will now be described with reference to FIG. 8. In step 250, each I/O card driver file includes an initialization portion which is run at start-up. Where the PNP I/O card 32 supports a peripheral device (e.g., printer 52) requiring a peripheral device driver (e.g., where the PNP I/O card includes a parallel port, such as an Enhanced Parallel Port), a peripheral device driver is loaded. In contrast, where the PNP I/O card does not support a peripheral device requiring a peripheral device driver (e.g., a video card), no peripheral device driver is loaded. Thus, at step 252 the processor 12 determines whether a peripheral device driver is needed. If no peripheral device driver is needed, the initialization procedure is complete. If a peripheral device driver is needed, the processor 12 in step 258 reads the peripheral device driver file size from a memory storage device in the peripheral device. In this regard, the processor 12 executes the initialization routine to read the peripheral device driver file size from a memory storage device in the peripheral device. The processor 12 executing the initialization routine reads the peripheral device driver file size from a predetermined address (e.g., specified in the Enhanced Parallel Port specification). The peripheral device driver file size is read by the processor 12 by writing the address of a desired memory location to an ADDRESS port, followed by a read of data from a READ_DATA port. In response to such read, a processing unit (e.g., CPU 70 of printer 52) in the peripheral device responds with data at the READ_DATA port representing the size of the peripheral device driver file. Next, the processor 12 reads the peripheral device driver data from the memory in the peripheral device (e.g., printer 52). Accordingly, the ADDRESS and READ_DATA ports are accessed to obtain the peripheral device driver data. Each time the processor 12 reads from the READ_DATA port, a bus width of data (i.e. data the size of the width of I/O bus 30) is provided to the processor 12. Accordingly, the processor 12 in steps 260 and 262 will read data from the READ_DATA port multiple times in order to obtain all of the peripheral device driver data. The number of read requests is based upon the peripheral device driver file size. Collectively, the peripheral device driver data read from the memory of the peripheral device comprises the complete peripheral device driver file. Once the peripheral device driver data has been downloaded from the peripheral device and stored to system memory 18, the initialization routine of the peripheral device driver is run at step 270. The peripheral device driver is installed in the computer system 10, thus completing step 242.

It should be appreciated that for the purposes of describing a preferred embodiment of the present invention, the peripheral device driver file is downloaded each time the computer system 10 is powered on with the peripheral device (P1–P4) attached to an I/O card 32. However, it is contemplated that the present invention may be modified such that the peripheral device driver file need only be downloaded once from the peripheral device (P1–P4), and thereafter it is retrieved directly from system memory 18 or from an external storage device (e.g., hard disk drive).

As indicated above, the present invention can be applied to other bus standards, including the Universal Serial Bus (USB). The USB is an industry standard extension to the PC architecture with a focus on Computer Telephony Integration (CTI), consumer, and productivity applications. The USB is a fast, bidirectional, isochronous, low-cost, dynamically attachable serial interface. The USB standard provides for the transfer of communication signals and power over a four wire cable (Vbus, D+, D– and GND). Moreover, the USB standard allows for the daisy chaining of peripheral devices.

Figure 9:
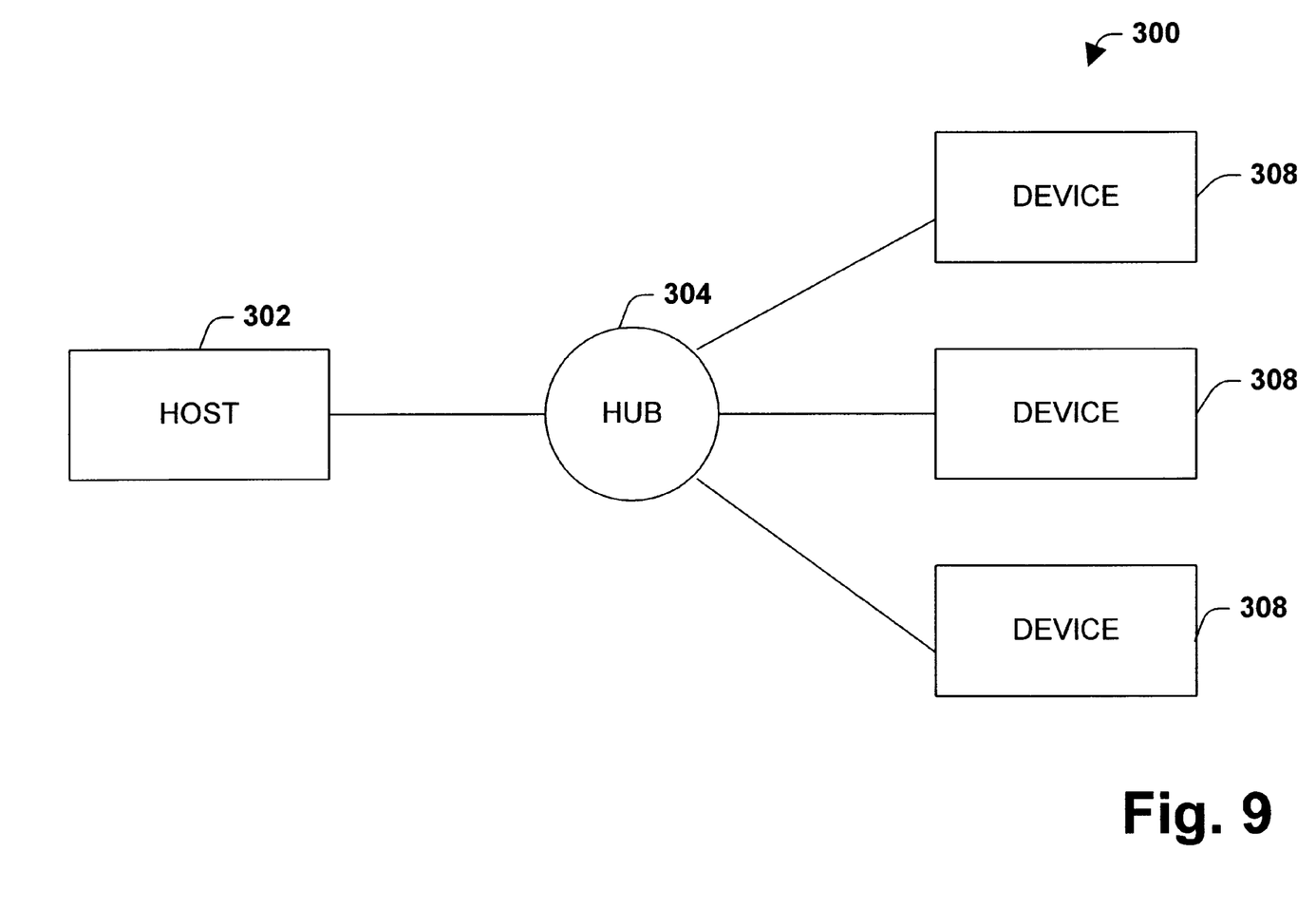
FIG. 9 is a block diagram of a Universal Serial Bus (USB) configured system according to one particular aspect of the present invention.

A USB 300 is shown connect USB devices with a USB host. The USB physical interconnect is a tiered star topology. A hub is at the center of each star. Each wire segment is a point-to-point connection between the host and a hub or function, or a hub connected to another hub or function. A USB system has only one host. The USB interface to the host computer system is known as the "host controller." The host controller may be implemented in a combination of hardware, firmware, or software. A root hub is integrated within the host system to provide one or more attachment points. USB devices are hubs (which provide additional attachment points to the USB) and functions (which provide capabilities to the computer system; e.g., an ISDN connection, a printer, a keyboard, a mouse, a digital joystick, speakers and other peripheral devices). USB devices present a standard USB interface in terms of their comprehension of the USB protocol, response to standard USB operations such as configuration and reset, and standard capability descriptive information.

All USB devices attach to the USB via a port on a USB hub. The hub indicates attachment or removal of a USB device in its per port status. The host queries the hub to determine the reason for the notification. The hub responds by identifying the port used to attach the USB device. The host enables the port, and addresses the USB device with a control pipe using a USB Default Address. All USB devices are addressed using the USB Default Address when initially connected or after they have been reset. The host determines if the newly attached USB device is a hub or a function (e.g., peripheral device) and assigns a unique USB address to the USB device. The host establishes a control pipe for the USB device using the assigned USB address and endpoint number zero. If the attached USB device is a hub and USB devices are attached to its ports, then the above procedure is followed for each of the attached USB devices. If the attached USB device is a function, then attachment notifications will be dispatched by USB software to interested host software.

An embodiment of the present invention, as used with a USB configured computer system, will now be described with reference to FIGS. 9 and 10. FIG. 9 shows a USB-configured computer system 300. Computer system 300 includes a host 302, a hub 304 and devices 308. When no device 308 is attached to the downstream port of the host 302 or hub 304, or a pull-up resistor on an attached device is not powered, pull-down resistors will cause both voltages D+ and D– to be pulled below a single-ended low threshold of 0.6 V at the host or hub port. This creates a state called a "single-ended zero" on the downstream port. A disconnect condition is indicated if a "single-ended zero" persists on a downstream port for more than 2.5 $\mu$s. A connect condition is detected when a device 308 is connected to the host or hub's port, and one of the data lines is pulled above the single-ended high threshold level of 1.5 V for more than 2.3 $\mu$s.

When hub 304 detects the presence of the new device 308, it reports the presence of the new device 308 to host 302. Host 302 manages an address table and determines an address for the new device 308. The address for the new device is communicated by the host 302 to hub 304. Hub 304 and the host 302 initially communicate with the new device by use of the USB default address. As indicated above, the initial communication assigns a unique address to the new device 308, and thereafter all communications with the new device 308 take place via the unique address. In response to the initial packet, the new device 308 reports configuration data back to hub 304. In turn, hub 304 relays the configuration data to host 302. The configuration data identifies the device driver stored in a data storage means in the device. Next, host 302 requests a device driver from the new device

308. In response, the new device 308 sends a device driver to the host 302. Thereafter, the host 302 loads and runs the device driver.

As mentioned above, If the interface is a USB, the code will be downloaded via a serial packet. A typical packet format would be used with a header, etc. The packet will go back via the bus to the host computer 302. The host computer 302 will reconstrust the packet back into the original driver code, and send a command back to the peripheral device 308 to end the downloading pf the device driver. A USB interface chip plus software would handle the receiving of the packet. FIGS. 5a and 5b illustrate exemplary packet formats for carrying out the present invention.

Figure 10:
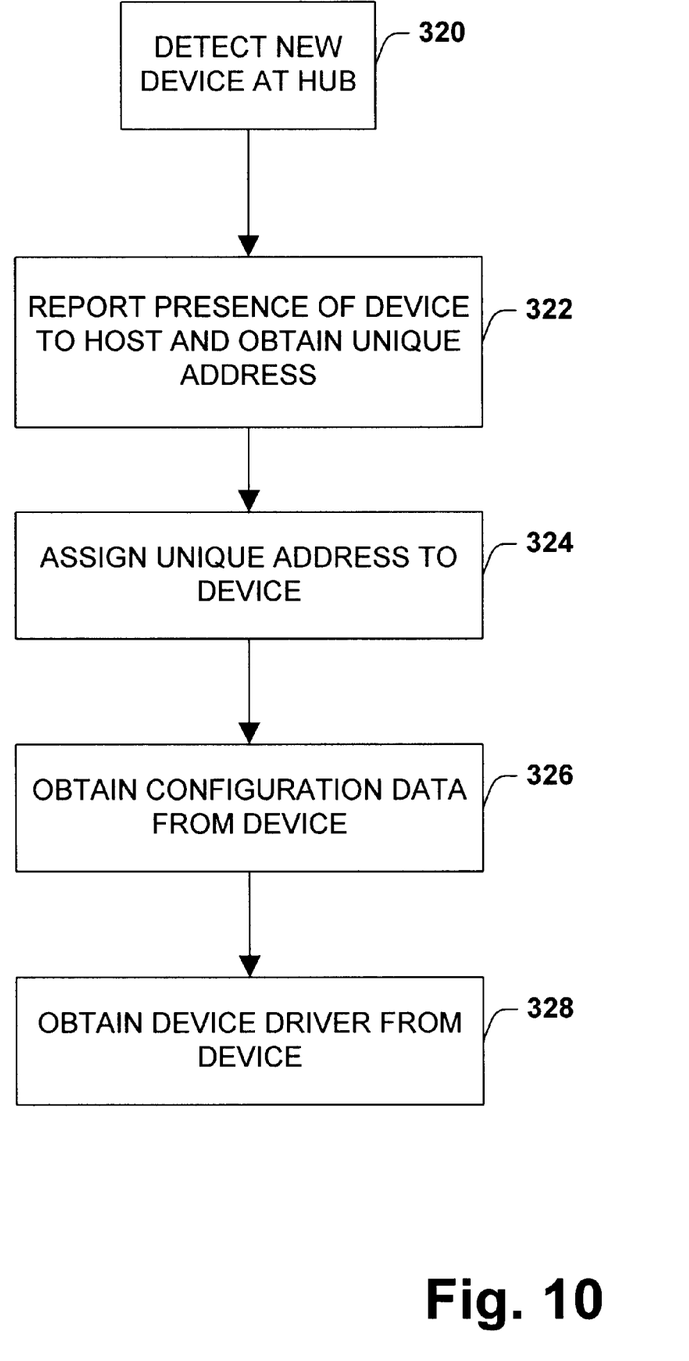
FIG. 10 is a flow diagram showing an overview of the procedure for configuring a computer system having a USB configuration according to one particular aspect of the present invention.

FIG. 10 shows a flow diagram summarizing the procedure for configuring the USB computer system 300. First in step 320 the new device 308 is detected at the hub. Next in step 322, the presence of the new device 308is reported to the host 302 to obtain a unique address for the new device 308. At step 324, the host 302 assigns a unique address to the device 308. As noted above, an USB default address is used for initial communication. Next in step 326, configuration data is obtained from the new device 308, which in turn allows the device driver to be downloaded from the device in step 328.

It should be appreciated that the concept of the present invention can be extended further. In this regard, the I/O card driver data stored in the I/O card 32, or the peripheral device driver data stored in the peripheral device (P1–P4) may be suitably modified to specify a web site location (URL) on the Internet, where a most up-to-date peripheral device driver is posted. This up-to-date peripheral device driver could then be automatically downloaded to the computer system 10. Accordingly, the present invention can be utilized to install and maintain peripheral devices with the most current and compatible peripheral device driver software.

In another extension of the present invention, the peripheral device driver file may be suitably coded in JAVA or other cross-platform procedural programming language (e.g., "C"). Java is an object-oriented, distributed secure, architecture neutral language. Java provides for object-oriented design which facilitates the clean definition of interfaces and makes it possible to provide reusable "software ICs." Java has an extensive library of routines for copying easily with TCP/IP protocols like HTTP and FTP.

Java applications can open and access objects across a network via URLs with the same ease to which programmers are accustomed to accessing a local file system.

Furthermore, Java has a pointer model that eliminates the possibility of overwriting memory and corrupting data. Instead of pointer arithmetic that is employed in many conventional systems, Java has true arrays. This affords for subscript checking to be performed. In addition, it is not possible to turn an arbitrary integer into a pointer by casting.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating bytecode instructions which have nothing to do with a particular computer architecture. Rather, they are designed to be both easy to interpret on any machine and easily translated into native machine code on the fly.

Being architecture neutral, the "implementation dependent" aspects of the system are reduced or eliminated. The Java interpreter can execute Java bytecodes directly on any machine to which the interpreter has been ported. Since linking is a more incremental and lightweight process, the development process can be much more rapid and exploratory. As part of the bytecode stream, more compile-time information is carried over and available at runtime.

The present invention through the use of Java affords for multiplatforming. That is the same peripheral device driver can be run on substantially all computers - the same applet (a program designed to be delivered through a browser) can work on a Macintosh, a Windows 95 machine, a Sun workstation, etc. To effect such multiplatforming, a network connection and a network browser (not shown) such as Netscape Navigator or Microsoft Internet Explorer may be used in at least one embodiment of the present invention. Although the present invention is described with respect to employing Java, it will be appreciated that any suitable programming language may be employed to carry out the present invention.

Thus, the present invention allows the peripheral device driver file to be both processor and operating system independent. As a result, a single peripheral device driver would be suitable for use in connection with a Pentium PC running OS/2, a Pentium PC running WINDOWS95, a Power PC running MAC OS, or any other processor or operating system (e.g., UNIX). Moreover, the peripheral device driver could be coded in object code, thus providing an operating system independent code. Accordingly, the present invention can be utilized to provide easy-to-install peripheral devices, which are compatible with a wide variety of computer systems.

It will be appreciated from the discussion herein that the present invention provides integrating a device driver with the device itself. As a result, the present invention overcomes the problems associated with conventional techniques for installing device drivers. The present invention further provides for a method for retrieving the device driver software from the peripheral device upon powering of a computer system the device has been newly added to. As a result of the driver being located within the device itself, the need to supply a separate disk or CD-ROM with each peripheral device is eliminated. This feature of the present invention removes the need to maintain disks or CD-ROMS containing device driver software.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A peripheral device operative to be coupled to a computing system, comprising:

a processor for processing various functions relating to the operation of the peripheral device; and a memory operatively coupled to the processor, the memory storing a device driver for the peripheral device;

the peripheral device configured to be coupled to an I/O device;

wherein the peripheral device downloads the device driver to the computing system after the computing system determines the device driver is needed, the computing system making such determination based on whether the I/O device supports the peripheral device.

2. The peripheral device of claim 1, wherein the peripheral device is adapted to download the device driver to a computer of the computing system.

3. The peripheral device of claim 2, wherein the peripheral device downloads the device driver to the computer upon receipt of a driver download command from the computer.

4. The peripheral device of claim 1, wherein the device driver is downloaded in a packet format.

5. The peripheral device of claim 3, wherein the peripheral device further informs the computer of the file size of the device driver.

6. The peripheral device of claim 1, wherein the peripheral device is a printer.

7. The peripheral device of claim 1, wherein the peripheral device is a mouse.

8. A system for installing a peripheral device to a computer system, comprising:

a peripheral device operatively coupled to the computer system via an I/O card, the peripheral device including a first processor and a first memory, the first memory storing a device driver for the peripheral device;

a second processor for processing functions relating to the computer system, the second processor being operative to be coupled to the peripheral device; and a second memory operatively coupled to the second processor;

wherein the second processor analyzes the I/O card and reads he device driver from the first memory if the I/O card includes a parallel port.

9. The system of claim 8, the I/O card including a third memory for storing I/O card driver data.

10. The system of claim 9, wherein the processor institutes transfer of the I/O card driver data to the second memory, and the device driver to the second memory in accordance with the I/O card driver data.

11. The system of claim 10, wherein the I/O card driver data includes an I/O card driver file, the processor executing the I/O card driver file to identify and locate the device driver stored in the first memory.

12. The system of claim 10, wherein the processor learns the file size of the device driver.

13. The system of claim 10, wherein the device driver is in the form of at least one of: executable program code, source code, and platform independent language code.

14. The system of claim 13, wherein the platform independent language code is JAVA.

15. The system of claim 13, wherein the platform independent language code is C.

16. The system of claim 10, wherein the transfer is accomplished during a computer boot-up procedure.

17. The system of claim 10, wherein the computer boot-up procedure includes a Plug and Play ISA power-up sequence.

18. The system of claim 8, further including a universal serial bus.

19. The system of claim 8, wherein the device driver is downloaded in a packet format.

20. The system of claim 8, wherein the device is a printer.

21. The system of claim 8, wherein the device is a mouse.

22. A method for installing a peripheral device driver to a computer system, including the steps of:

connecting a peripheral device to the computer system, the peripheral device including:

a first processor for processing various functions relating to the operation of the peripheral device; and a first memory operatively coupled to the processor, the first memory storing the peripheral device driver for the peripheral device;

analyzing an I/O card operatively to determine if the I/O card supports the peripheral device;

transferring the peripheral device driver form the first memory to the computer system, the computer system including:

a second processor for processing functions relating to the computer system, the second processor being operatively coupled to the peripheral device; and a second memory operatively coupled to the second processor.

23. The method of claim 22, further including the step of:

transferring the device driver from the first memory to the second memory.

24. The method of claim 22, wherein the I/O card includes a third memory for storing I/O card driver data, the method further including the step of:

executing the I/O card driver data to identify the peripheral device.

25. The method of claim 24, further including the step of:

reading the file size of the peripheral device driver prior to transferring the device driver from the first memory to the second memory.

26. The method of claim 22, further including the step of using a Plug and Play ISA sequence.

27. The method of claim 22, further including the step of using a universal serial bus.

28. The method of claim 27, further including the step of transferring the device driver from the first memory to the second memory via a packet format.

29. A method of claim 22, further including the step of:

using the peripheral device to identify to the computer system a web site corresponding to the web site address, the web site having a peripheral device driver for the peripheral device, the peripheral device driver being downloadable to the computer system from the web site.

* * * * *

UNITED STATES PATENT AND TRADEMARK OFFICE
CERTIFICATE OF CORRECTION

PATENT NO.: 6,009,480

DATED: December 28, 1999

INVENTOR(S): Mark F. Pleso

It is certified that error appears in the above-identified patent and that said Letters Patent is hereby corrected as shown below:

Column 15, line 40, please change the word "he" to --the--.

Column 16, line 24, please change the word "form" to --from--.

Signed and Sealed this

Eighth Day of August, 2000

*Attest:*

Q. TODD DICKINSON

*Attesting Officer*          *Director of Patents and Trademarks*